(12) United States Patent
Winkler

(10) Patent No.: US 8,284,996 B2
(45) Date of Patent: Oct. 9, 2012

(54) MULTIPLE OBJECT SPEED TRACKING SYSTEM

(75) Inventor: Thomas D. Winkler, Fenton, MO (US)

(73) Assignee: Automated Speed Technologies, LLC, Sunset Hills, MO (US)

(*) Notice: Subject to any disclaimer, the term of this patent is extended or adjusted under 35 U.S.C. 154(b) by 342 days.

(21) Appl. No.: 12/653,705

(22) Filed: Dec. 17, 2009

(65) Prior Publication Data
US 2010/0172543 A1   Jul. 8, 2010

Related U.S. Application Data

(60) Provisional application No. 61/201,976, filed on Dec. 17, 2008.

(51) Int. Cl.
*G06K 9/00* (2006.01)
(52) U.S. Cl. .................................. 382/104; 382/107
(58) Field of Classification Search .................. None
See application file for complete search history.

(56) References Cited

U.S. PATENT DOCUMENTS

| | | | |
|---|---|---|---|
| 5,381,155 A | 1/1995 | Gerber |
| 5,509,082 A | 4/1996 | Toyama |
| 5,734,337 A | 3/1998 | Kupersmit |
| 5,912,822 A | 6/1999 | Davis |
| 5,935,190 A | 8/1999 | Davis |
| 5,948,038 A | 9/1999 | Daly |
| 6,240,217 B1 | 5/2001 | Ercan |
| 6,353,678 B1 | 3/2002 | Guo |
| 6,373,402 B1 | 4/2002 | Mee |
| 6,546,119 B2 | 4/2003 | Ciolli |
| 7,333,634 B2 | 2/2008 | McClanahan |
| 2002/0060640 A1 | 5/2002 | Davis |
| 2010/0128127 A1 | 5/2010 | Ciolli |

FOREIGN PATENT DOCUMENTS

| | | |
|---|---|---|
| DE | 44 34 131 A1 | 3/1996 |
| WO | WO 2007/036873 A2 | 4/2007 |

OTHER PUBLICATIONS www.officer.com; Law Enforcement News; "Arizona to Deploy Speed Cameras"; Sep. 24, 2008.
www.chronline.com; The Chronicle Online; "I-5 Ticketing Cameras to Be Activated by Month's End"; Eric Schwartz; Sep. 6, 2008.
www.thenewspaper.com; "Speed Camera Vendors Engage in All-Out Battle"; Aug. 20, 2008.
Gardel, A. et al; "Detection and Tracking Vehicles Using a Zoom Camera Over a Pan and TIlt Unit"; Intelligent Vehicle Symposium; Jun. 17, 2002; pp. 215-220; vol. 1; IEEE; USA.
Wei-Khing for, et al; "A multi-camera collaboration framework for real-time vehicle detection . . ."; Intelligent Vehicle Symposium; Jun. 4, 2008; pp. 192-197; IEEE; USA.
PCT International Search Report, dated Jun. 4, 2010, for International Application No. PCT/US2009/006599.
PCT International Preliminary Report on Patentability, dated Feb. 18, 2011, for International Application No. PCT/US2009/006599.

*Primary Examiner* — Claire X Wang
(74) *Attorney, Agent, or Firm* — Douglas E. Warren

(57) ABSTRACT

A multiple object speed tracking system that can provide data related to the rate of travel of each object in a set of multiple objects as each object is traveling either toward or away from a predetermined point.

24 Claims, 11 Drawing Sheets

MULTIPLE OBJECT SPEED TRACKING SYSTEM

CROSS REFERENCE TO RELATED APPLICATIONS

This application claims the benefit of priority of Provisional Application Ser. No. 61/201,976 filed on Dec. 17, 2008, and that application is incorporated by reference herein in its entirety for all beneficial purposes.

STATEMENT REGARDING FEDERALLY SPONSORED RESEARCH

Not Applicable.

BACKGROUND OF THE INVENTION

There are a number of situations where there is a significant need to be able to track the movement of multiple objects as those objects travel toward or away from a preset point. These situations can include sporting events such as car racing, horse racing, and track & field events. Additionally, there are other non-sporting situations where the same need exists. A primary example is in the field of police enforcement of vehicle speeds on roadways where specific speed limits are in force.

While there are number of devices that are generally capable of tracking and determining the speed of an individual vehicle traveling on such roads, there is a substantial problem in detecting and determining the speed of multiple vehicles traveling on multi-lane roadways. For example, the most common form of speed detection devices used by law enforcement include laser based and radar based devices. Although these are presently the predominantly used devices, the correlation between the speed shown on those speed detection devices with the actual vehicle that is speeding can be very problematic.

For example, if a law enforcement officer establishes a point near a roadway to monitor the speed of the vehicles traveling on the roadway, the officer must first detect a speeding vehicle and then determine which vehicle was speeding. The present state of the radar and laser based detection devices do not provide that type of automatic and technical discrimination ability. In most cases, it is the law enforcement officer's responsibility to correlate speeding detection signaled by the speed monitoring device with what the officer observes at the moment the speed detection device indicates a speeding vehicle. If the monitored roadway is only a two lane road, the volume of traffic is usually small enough that the speeding vehicle can be readily determined by the officer's observations. However, if the monitored roadway has more than one lane for each direction of traffic, the officer faces a much more difficult time in deciding which or perhaps two or more vehicle are the speeding vehicle.

This problem reaches its highest levels when the roadway being monitored is an Interstate super highway where as many as five or six lanes of traffic are moving in the same direction. This problem is further exacerbated when each of the five or six lanes contains a large number of vehicles. In those types of situations, if the currently used radar based or laser based speed detection device signals the law enforcement officer that a speeding vehicle has been detected, the multitude of vehicles traveling and a large number of lanes makes it extremely difficult for the law enforcement officer to make an accurate and positive determination of which of the vehicles is speeding. Additionally, there may in fact be more than one vehicle speeding and the officer may be forced to select just one vehicle that appears to be speeding and cite that single vehicle for exceeding the local speed limit.

While law enforcement officers have done well in observing and detecting which vehicle is speeding when the speed detection device signals a speeding vehicle, sometimes the criteria used by the law enforcement officer may allow some speeding violators to evade the law enforcement officer's detection. For example, in multi-vehicle, multilane situations where the observed differences in the speeds of the vehicles cannot be quickly observed, the officer may sometimes suspect that the vehicle in the left lane, the so-called "fast lane" of an Interstate roadway, is the speeding vehicle. Individuals who are known to speed often have used this bias against the law enforcement officer by speeding on a multi-lane highway using on the far right lane, the so-called "slow lane" of an Interstate roadway, to essentially hide their violations from the law enforcement officers.

Therefore, there is a need for a system by which a law enforcement officer can monitor relatively higher volumes of traffic moving on multiple lane roadways and still be able to accurately determine the traveling speed of each moving vehicle and then specifically identify the ownership of the vehicle that has been traveling at a rate that exceed the maximum rate allowed for the monitored roadway.

SUMMARY OF THE INVENTION

In accordance with the various embodiments of the present invention, this invention relates to an apparatus and method for tracking of at least two objects to determine the speed of each of the individual objects as each one travels either toward or away from a predetermined reference point and to provide data regarding each of the objects where such data includes at least the speed at which each of the individual objects is traveling either toward or away from the predetermined reference point.

One example of the various embodiments of the present invention is a Multiple Vehicle Speed Tracking (MVST) system that is capable of tracking a number of individual vehicles traveling on a multi-lane roadway, and where the rate of speed can be separately determined for each of the individual vehicles on the multi-lane roadway. In certain of the MVST embodiments, the MVST can be either a mobile or a stationary multi-vehicle speed detection system that is capable of being used as either a day or night system in place of Laser, lidar, x-band, Ka-Band, Doppler radar systems. The various embodiments of the present invention can be mounted on police vehicles, trailers, bridges, poles, or any location near the road. In the MVST embodiments, the system can be utilized on multi-lane roads to track and calculate speeds of each and every vehicle simultaneously.

The preferred versions of the MVST embodiment comprise two digital video cameras housed in one camera assembly, and a small 1.6 Gigahertz speed or greater computer. Through image processing, one camera captures video images of multiple moving vehicles and tracks vehicles to calculate the speed of substantially all vehicles in the images. A second camera can also be used to capture video images useful for reading the license plate of the speeding vehicle.

The MVST embodiment can capture digital video with one camera and send its data to a computer for image processing. The computer can process video signals frame by frame utilizing well known algorithms and homographic processes developed in the machine vision field. It will be appreciated by those skilled in that art of image processing that extensive research has been done to develop techniques to locate, isolate, define and track objects. The present embodiment applies certain of those processing techniques in an unprecedented and unexpected manner that allow for the real-time tracking of substantially all vehicles across a multi lane roadway.

Certain embodiments of the present invention can then calculate the speed of the moving vehicles by measuring pixel coordinate point changes over time. After each vehicle position and speed is defined, the vehicles' locations are located in the camera field of view and then used to coordinate with an image from a second camera. This second camera can be used to capture a high-resolution image to acquire the license plate number of each speeder.

In the present embodiment of the invention, the operator will program the system by inputting the "local speed limit" and the "excessive speed limit" to be captured. The operator may or may not remain on site. May or may not chase the speeder. The system requires no human intervention once set up. After the "excessive speeding vehicle" pictures are taken, the pictures will be transferred to a main computer off site by a wireless or landline resource. The physical set-up of the present embodiment can be installed on a police car, trailer, tripod, bridge, pole or any area around the road being monitored.

More specifically, the MVST embodiment of the present invention measures the vehicle speeds on U.S. roadways by processing the video images of moving vehicles obtained by at least one digital video camera. The MVST embodiment is a real time system that uses limited resources in terms of quality of the cameras needed and the power of the processing unit (PC or Laptop), while still remaining a robust and accurate system. Additionally, within the present embodiment, the invention is capable of exploiting existing infrastructure that includes bridges over highway.

While one embodiment of the present invention is illustrated in the drawings included herein and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DESCRIPTION OF THE DRAWINGS

In the accompanying drawings which form part of the specification.

Corresponding reference numerals indicate corresponding steps or parts throughout the several figures of the drawings.

While one embodiment of the present invention is illustrated in the above referenced drawings and in the following description, it is understood that the embodiment shown is merely one example of a single preferred embodiment offered for the purpose of illustration only and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF AT LEAST ONE PREFERRED EMBODIMENT OF THE INVENTION

Figure 1:
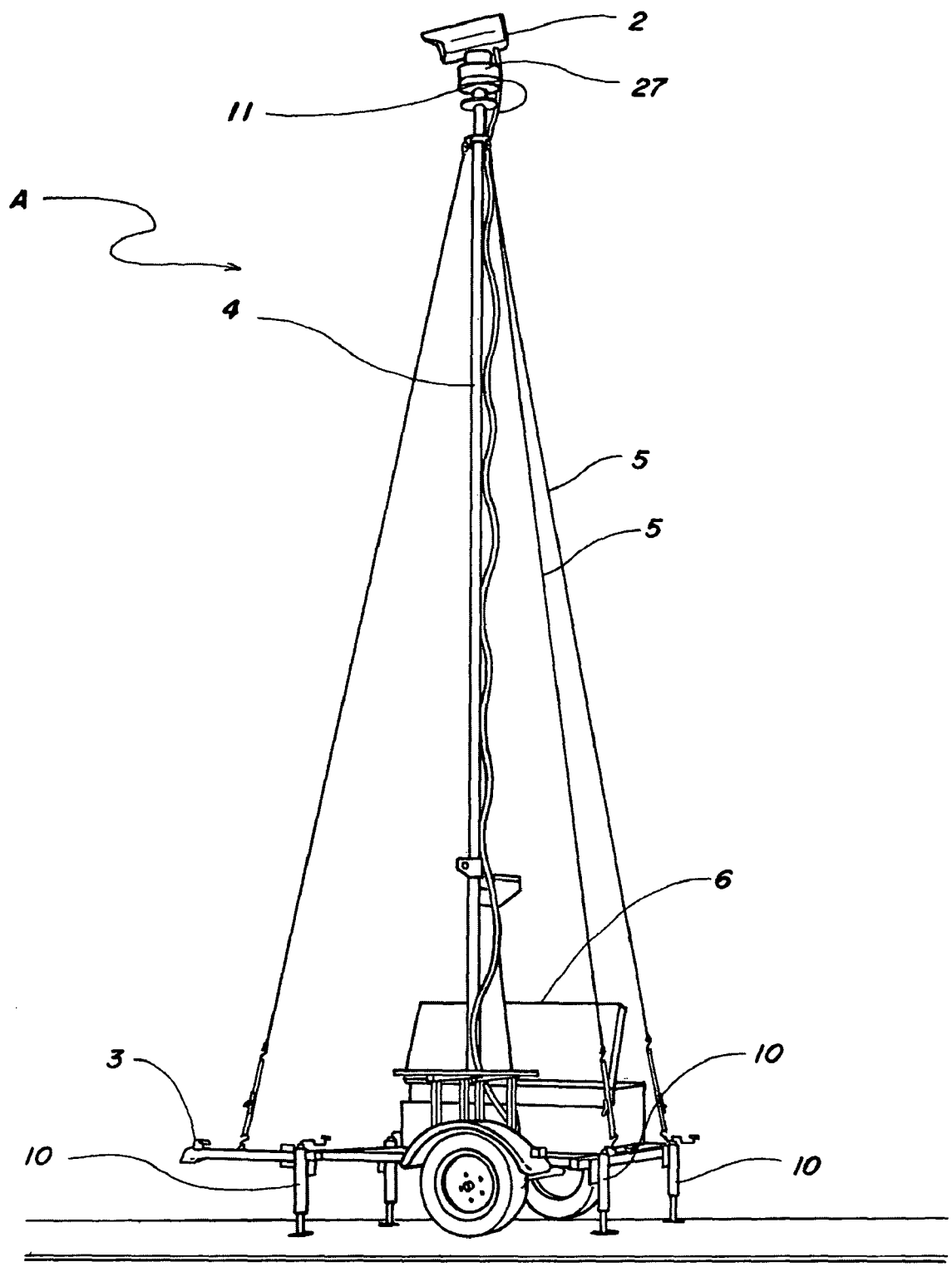
FIG. 1 is a perspective view of one embodiment of the present invention.
Figure 2:
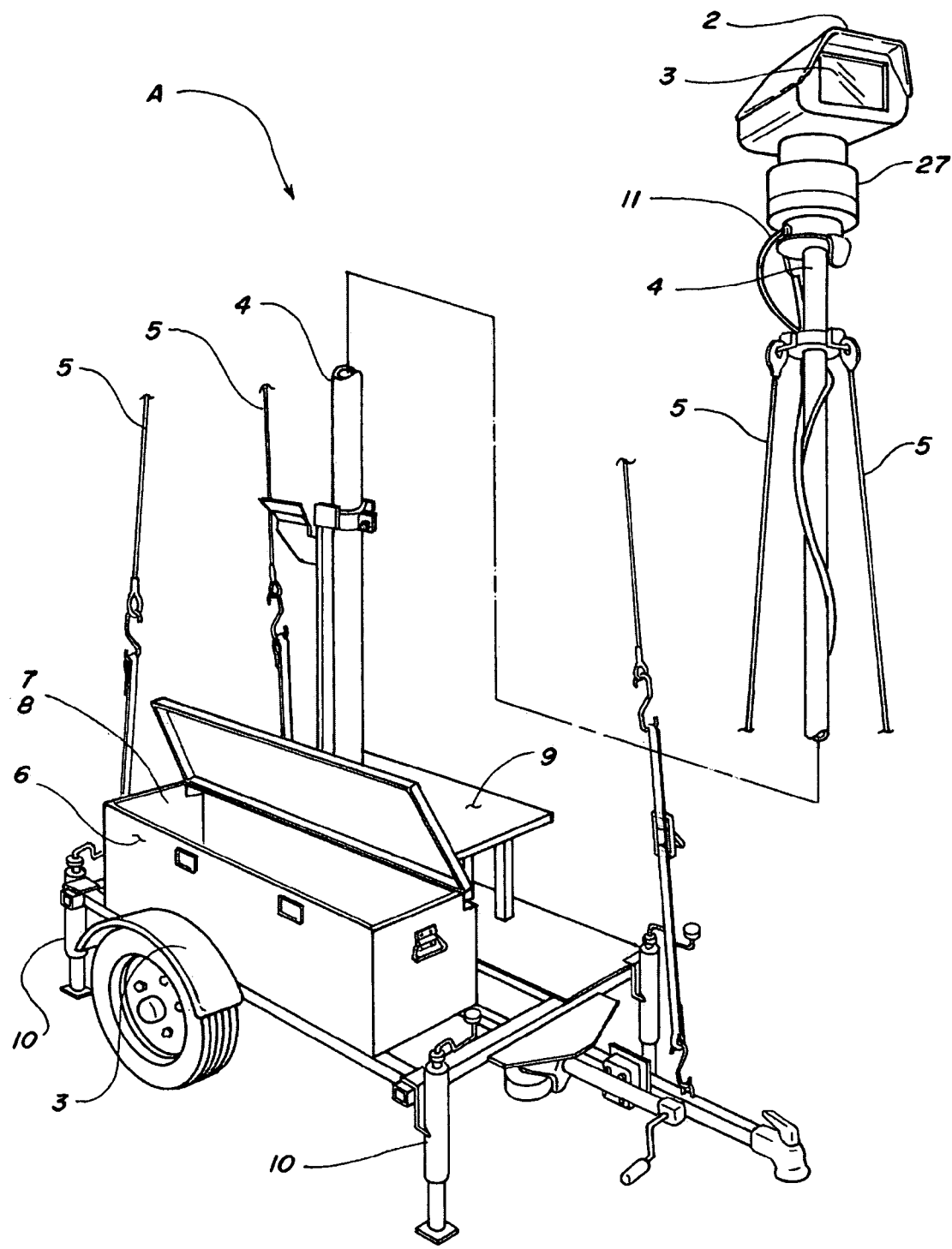
FIG. 2 is a close up perspective view of one embodiment of the present invention.

A preferred embodiment of the Multiple Object Speed Tracking System of the present invention is identified as the Multiple Vehicle Speed Tracking (MVST) embodiment. One version of the MVST embodiment A is as generally shown in FIGS. 1 and 2 and substantially comprises a trailer mounted version of the MVST.

In that embodiment, a trailer 1 is equipped with a video camera module 2 that houses at least one video camera 3. In a preferred embodiment of the MVST version, the video camera module 2 houses one low resolution video camera 3A and one high resolution video camera 3B. The video camera module 2 is mounted on a mast 4 mounted onto the trailer 1 and brace by a set of guy wires 5. A box 6 contains a computer system 7 and the other electrical and electronic components needed to power and control the MVST electronic components, including the software package 8. An operator reference table 9 is mounted on the trailer 1 and provided a work surface for the MVST operator. A set of leveling devices 10 are mounted to the trailer 1 to allow the trailer to be leveled. In one preferred environment, the software package 8 runs on a computer system equipped with Windows XP higher operating system. In yet other embodiments, the software package 8 be located and ported as a dedicated and embedded system mounted within the box 6.

The mast 4 can include a camera positioning mechanism 11 that is used to orient, tilt, or pan the video camera 3 mounted in the video camera module 2. At least one interface cable 11 connects the video camera module 2 to the computer system 7. The interface cable 11 can be used to communicate with the at least one video camera 3 and the positioning system 11.

It will be appreciated that while the current MVST embodiment of the present invention is mounted on a trailer 1 for transportation of the MVST system, other embodiments of the present invention include mounting of the MVST onto a car, truck, or other vehicle. In yet other embodiments, the MVST can be semi-permanently mounted to an existing roadway structure such as a bridge, a tower, a road sign, or other structure and still remain within the intended scope of the present invention.

Figure 3:
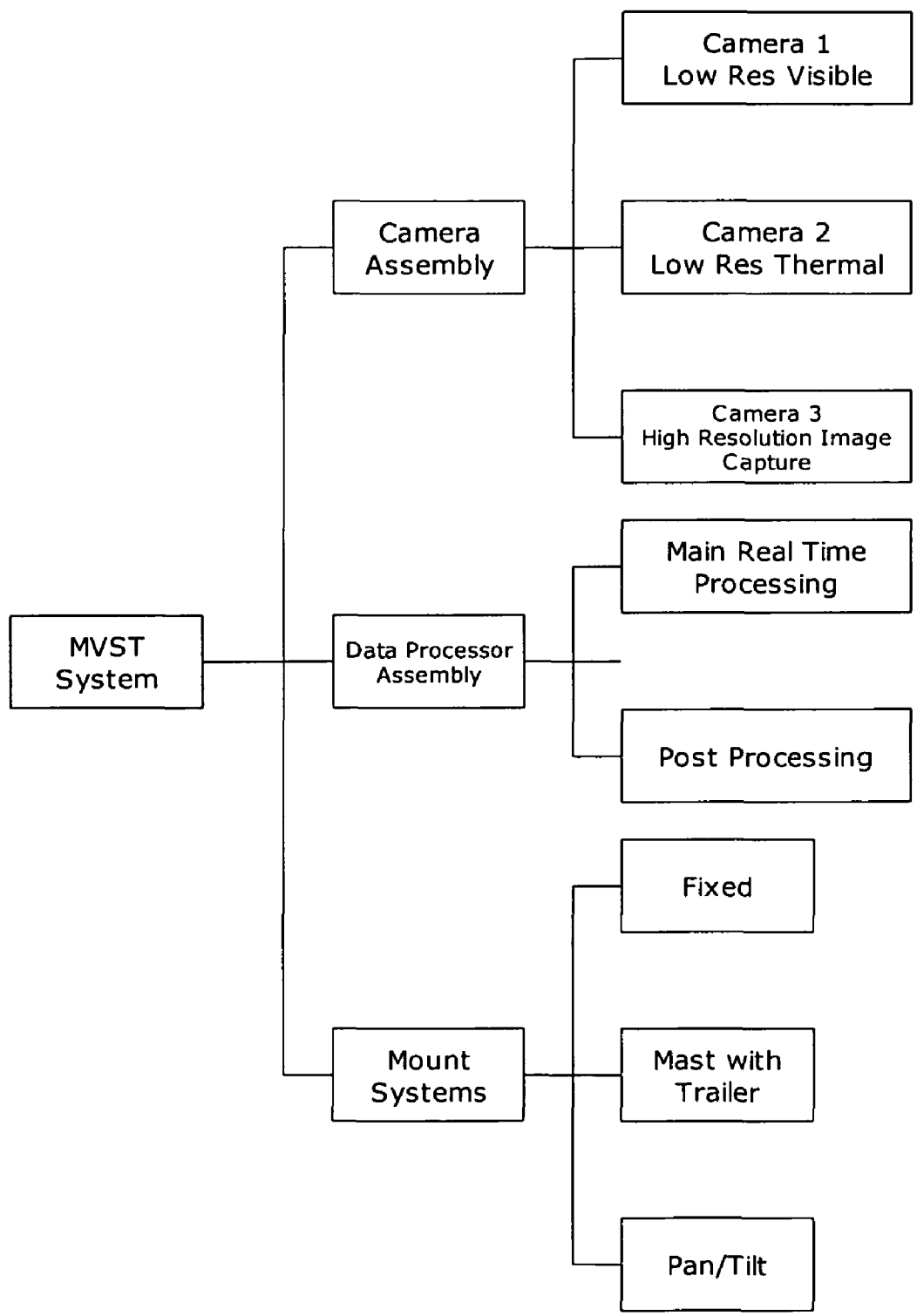
FIG. 3 is an general block diagram for the components of one embodiment of the present invention.
Figure 4:
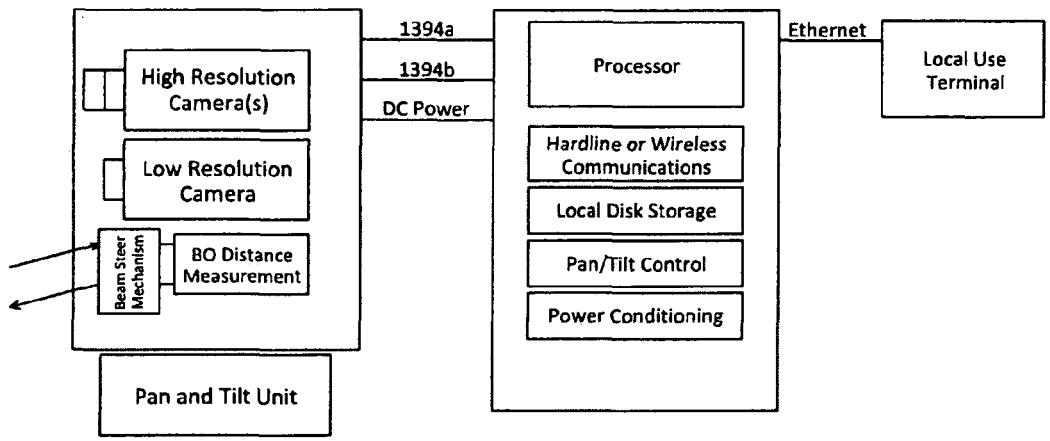
FIG. 4 is a functional schematic of one embodiment of the present invention.
Figure 5:
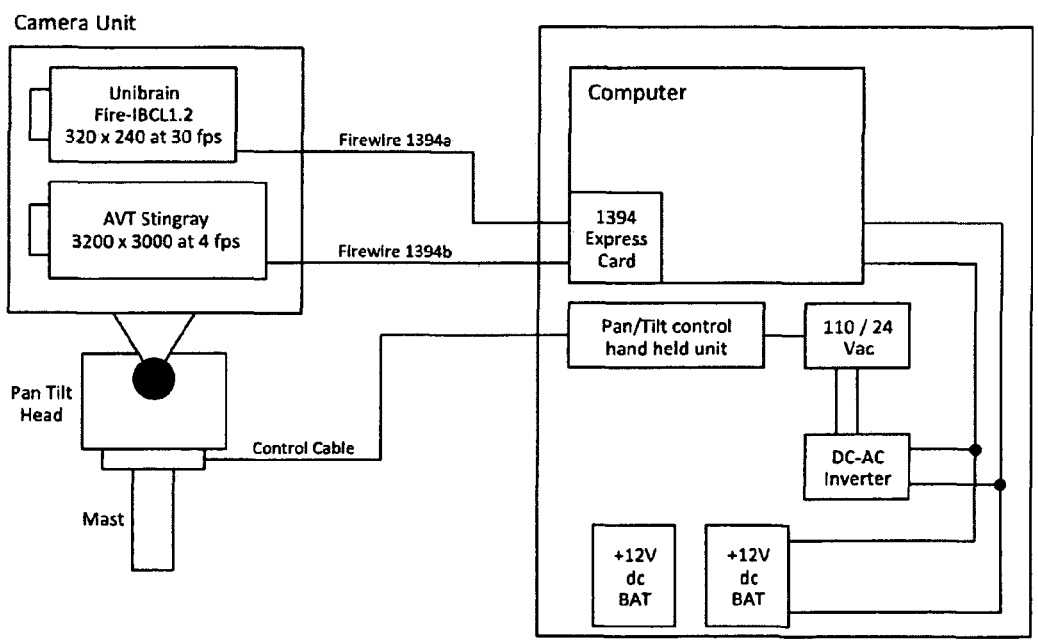
FIG. 5 shows an interconnection of the certain exemplary hardware components for one embodiment of the present invention.

It is also understood that there can be a number of various component configurations of the present invention that are still within the scope of the present invention. However, in many of the preferred embodiments, FIG. 3 shows a general block diagram that defines a preferred relationship between the primary components of the MVST embodiment. FIG. 4 is a functional schematic of the MVST embodiment that presents a general description of one version of the MVST system and the MVST functions. Interconnection of the certain exemplary hardware components is as shown in the diagram of FIG. 5. It will be appreciated that each of the exemplary components disclosed in FIG. 5 may be replaced with other specific components, or even groups of components, as long as the alternative components or groups of components generally operate to at least obtain the results as described herein.

In the MVST embodiment shown, the low resolution video camera 3A captures a set of low resolution video images 12A that include a set of vehicles that are traveling on a monitored roadway. Additionally, a high resolution video camera 3B captures a set of high resolution video images 12B of substantially the same set of vehicles that are traveling on the monitored roadway. The software package 8 processes data related to the set of low resolution video images 12A and the set of high resolution video images 12B. As described in further detail below, the software package 8 analyzes these sets of video images 12A and 12B to generates output data that can be used to determine vehicle speed, vehicle identification, and other related data as identified herein. The software package 8 can also generates other data related to the setup of the MVST embodiment and to establish parameters used in the real time processing.

In the MVST embodiment, the MVST system is set up at a location near the roadway to be monitored. In a preferred setup, the high resolution camera 3B can be placed in three distinctive places with respect of the road: (1) a top view where a camera is placed directly over the road at least about 15 feet above the ground plane; (2) a top-side view where a camera is at least about 15 feet above the ground, but not directly overhead the road; and (3) a side view where the camera is placed on a tripod about 3-5 feet above ground or inside a car parked alongside the road.

I. General Theory of Operation

Figure 6:
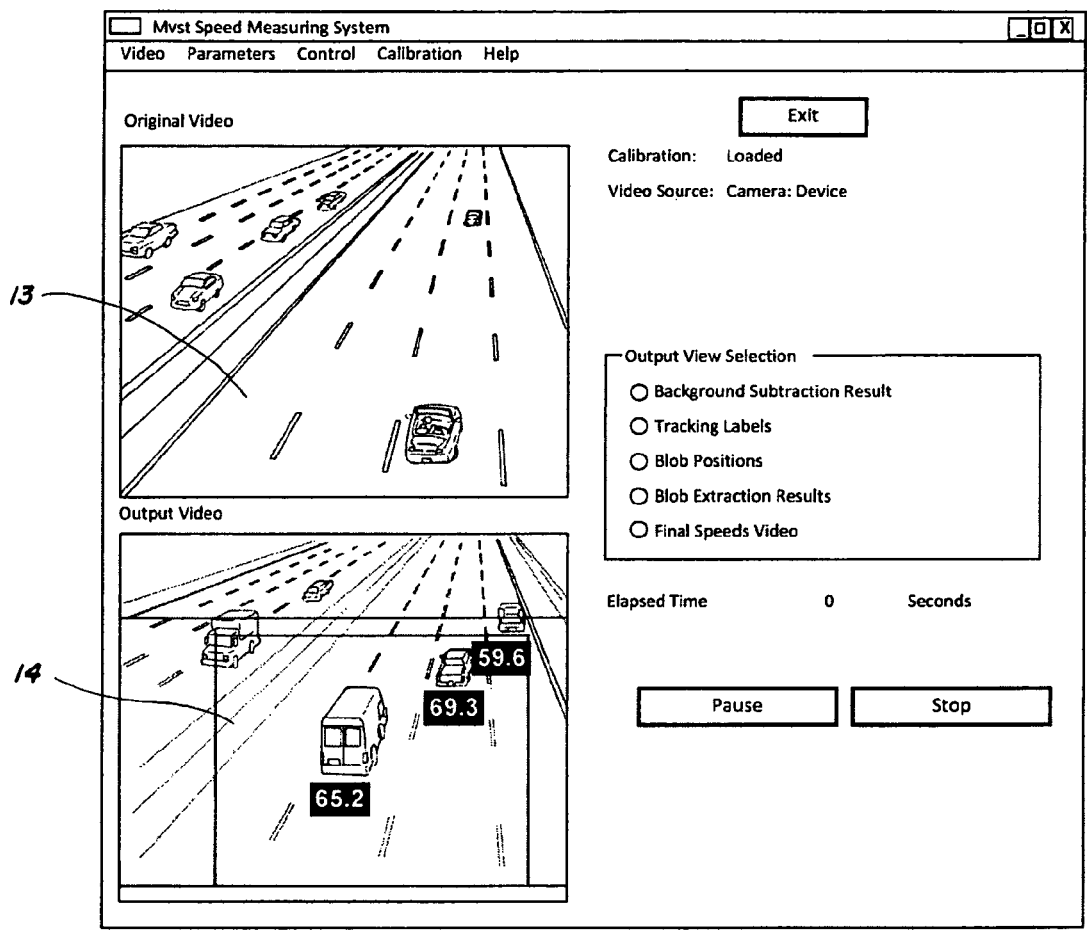
FIG. 6 shows an example of the one type of display that can be shown to the operator for one embodiment of the present invention.

In one preferred embodiment, the MOST is configured as a Multiple Vehicle Tracking System ("MVST") where the MVST is used to detect a moving vehicle traveling along a roadway and then to calculate the speed at which the detected vehicle is moving. FIG. 6 shows an example of the one type of display that can be shown to the operator of the MVST embodiment during the operation of the MVST system. The theory of operation of the MVST embodiment will be in part described in the following paragraphs and will be in part understood by those of skill in the art.

As an initial overview of the operation of the MVST embodiment, it is appreciated that the images captured by the video camera 3 must be analyzed by the software package 8. An initial stage is the determination of a detected vehicle 12. When the MVST has identified the detected vehicle 12, the speed of the detected vehicle on the monitored roadway is determined by calculating the distance the detected vehicle has traveled and then dividing that distance the detected vehicle has traveled by time it has taken the detected vehicle to move that distance. This is expressed by the formula of $r=d/t$ where $r$=rate of travel in miles per hour; $d$=distance traveled over a specific period; and $t$=the time taken to travel the distance.

To accomplish these tasks, the various embodiments of the present invention comprise a unique combination of components, hardware, and software. In certain preferred embodiments, the MVST uses these hardware and software components to provide the MVST operator with video images of detected vehicles 12. FIG. 6 shows one example of a display that provides the operator with information about the roadway being monitored and the detected vehicles 12. More specifically, a monitor view 13 FIG. 6 displays the set of low resolution video images 3A in substantially real time. A vehicle speed view 14 is also shown that includes the detected vehicles 12 and a vehicle speed box 15. The vehicle speed box 15 shows the speed of the detected vehicle 12 as calculated by the software package 8. It is understood that FIG. 6 also shows various tools that can be used by the operator to assist the operator in the viewing and analysis of the images displayed in FIG. 6.

The vehicle speed boxes 15 are generally superimposed on or adjacent the video image of the detected vehicle 12 in a manner that instructs the MVST operator as to the speed of movement for each particular detected vehicle in the video image. In the MVST embodiment, the software package 8 generates an incident data set 16 in the general form of electronic records where the data related to the detected vehicle 12, its speed, and other information regarding the specific identification of the detected vehicle can be stored. The incident data set 16 can be used as evidence use and analysis by law enforcement and traffic studies.

A. Primary Vehicle Detection

In various embodiments of the MVST, the vehicle detection operation and tracking of the distance the detected vehicle 12 has traveled includes an analysis of the set of low resolution video images 13A. In a preferred embodiment of the MVST, the low resolution video camera 3A is a low resolution video camera 3A having a resolution of about 320×240 pixels and a frame rate of about 30 frames per second. The low resolution video camera 3A in most embodiments include a lens that provides a field of view that can cover the width of the roadway being monitored by the MVST while still retaining good pixel distance resolution over a prime target tracking region. It will be appreciated that in preferred embodiments of the present invention, the low resolution video camera 3A is equipped with a low distortion lens to reduce or eliminate certain image corrections during processing.

The set of low resolution video images 12A generated by the low resolution video camera 3A provide video images to the MVST software package 8 that allow the software package to calculate the speed of the detected vehicle 12. The software package 8 determines the speed of the detected vehicle through a series of image processing steps as described below in the software package description.

Figure 7:
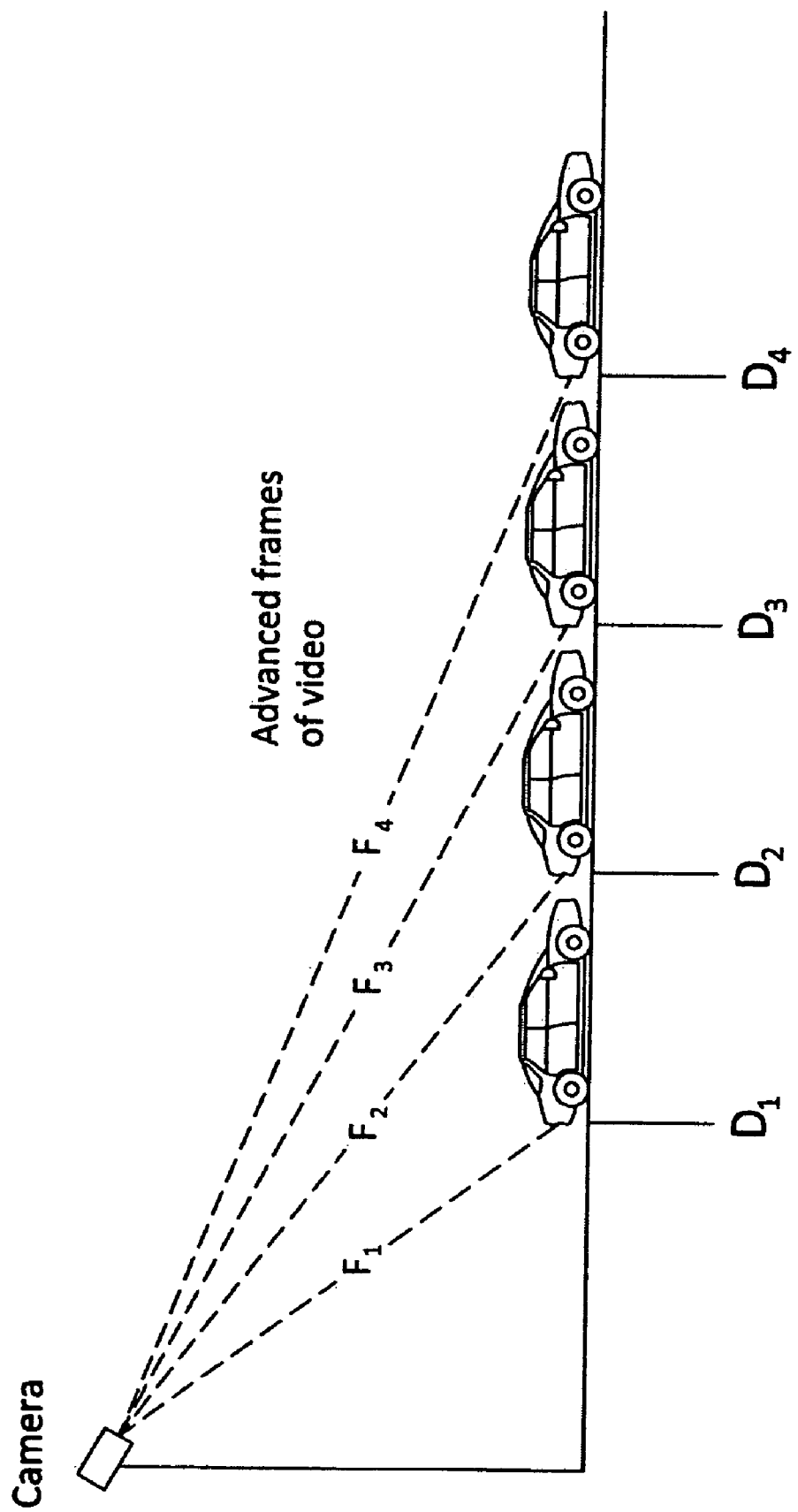
FIG. 7 shows a sample sequence of four frames for speed analysis of the video images for one embodiment of the present invention.

Part of the result of the processing of the set of low resolution video images 12A by the software package 8 includes determining a set of coordinates that can be used to identify the general location of a vehicle for each frame of the video image generated by the low resolution video camera 3A. For example, FIG. 7 depicts a sequence of four frames video image frames pictorially. The individual video frames in FIG. 7 are identified as F1, F2, F3, and F4. Four locations of the detected vehicle are identified in FIG. 8 as D1, D2, D3, and D4. FIG. 7 shows a composite view of all those four video frames overlapped and how the situation would look if the detected vehicle was viewed from the side. This information can be used to establish a track for the detected vehicle in a location versus a time mode. It is this information that can be used by the software package to determine the speed of the detected vehicle 12 by plugging in the distance values and the time values in the formula r=d/t to calculate the speed of the detected vehicle. The MVST software package 8 compares the calculated speed of the detected vehicle 12 to a predetermined speed entered into the MVST software package by the operator. If the calculated speed of the detected vehicle 12 is greater than the predetermined speed entered by the MVST operator, the MVST software package 8 generates the incident data set 16 and assembles that set of incident data into an incident report that contains data and images needed for use in issuing traffic violations to the driver of the detected vehicle 12.

Figure 8:
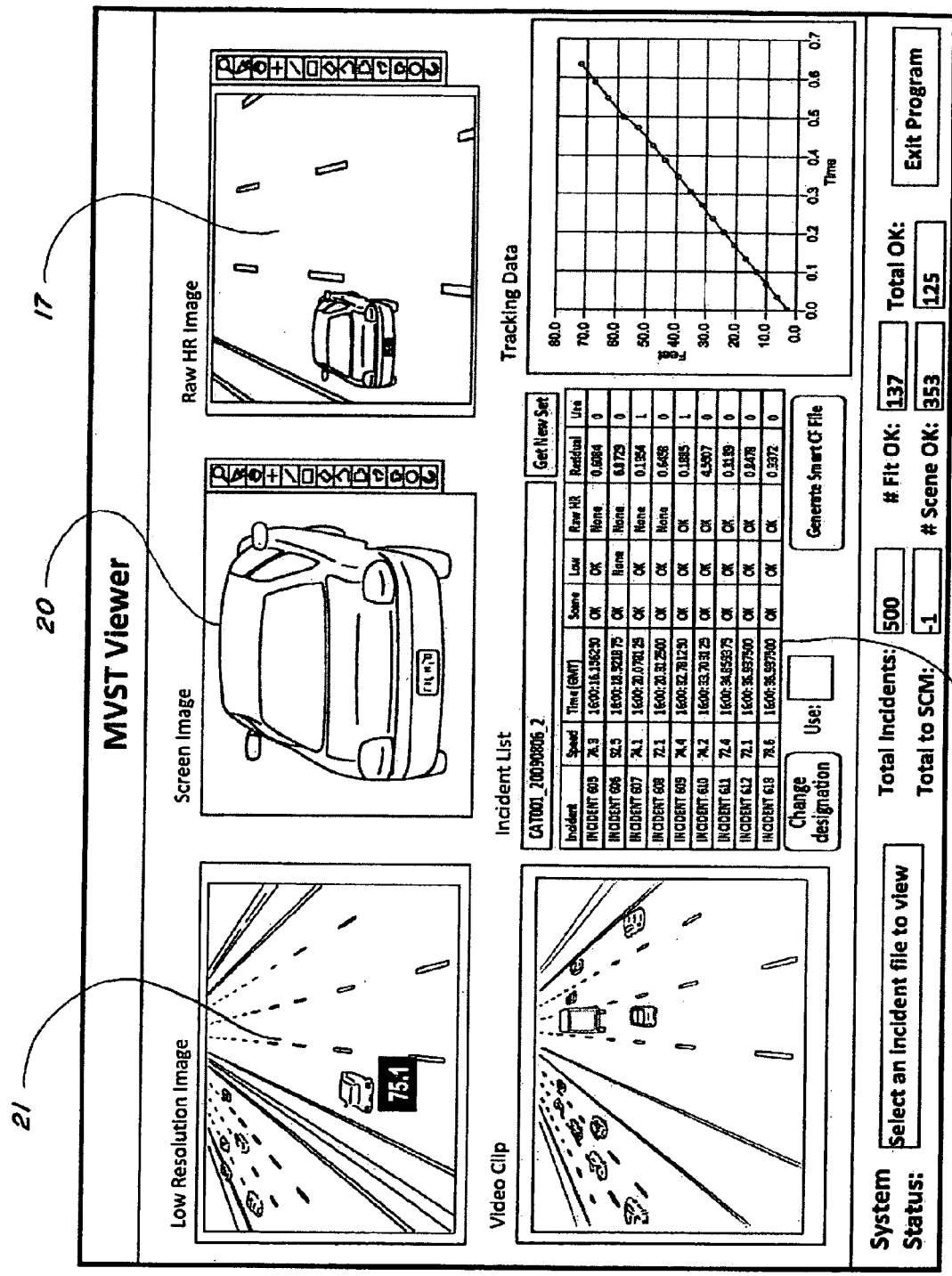
FIG. 8 shows a operator display of a typical set of incident data for one embodiment of the present invention.

One element of the incident data set 16 is a high resolution image 17 of any detected vehicle 12 that has been shown to exceed the predetermined speed for a roadway. As shown in FIG. 8, the high resolution image provides a higher resolution image of the violating detected vehicle 12 so that the license plate on the violating detected vehicle 12 can be read.

The high resolution image of 17 the violating detected vehicle 12 is generated by the high resolution video camera 3B. In certain preferred embodiments, the high resolution video camera 3B is a 5 mega pixel color camera that operates at approximately 4.7 frames per second. It will be appreciated by those of skill in the art that the frame rate will be as required by the communication channel throughput and may be increased by reducing the image size and the format of the pixel representation. The high resolution video camera 3B should be equipped with optics and lenses sufficient to provide the set of high resolution video images 12B as needed to allow for the reading of the license plates on the violating detected vehicle 12. Additionally, the field of view of the lens of the high resolution video camera 3B should also be as needed to provide images of the roadway being monitored such that all potentially violating detected vehicles 12 can have high resolution images obtained of that violating detected vehicle's license plates.

Figure 9:
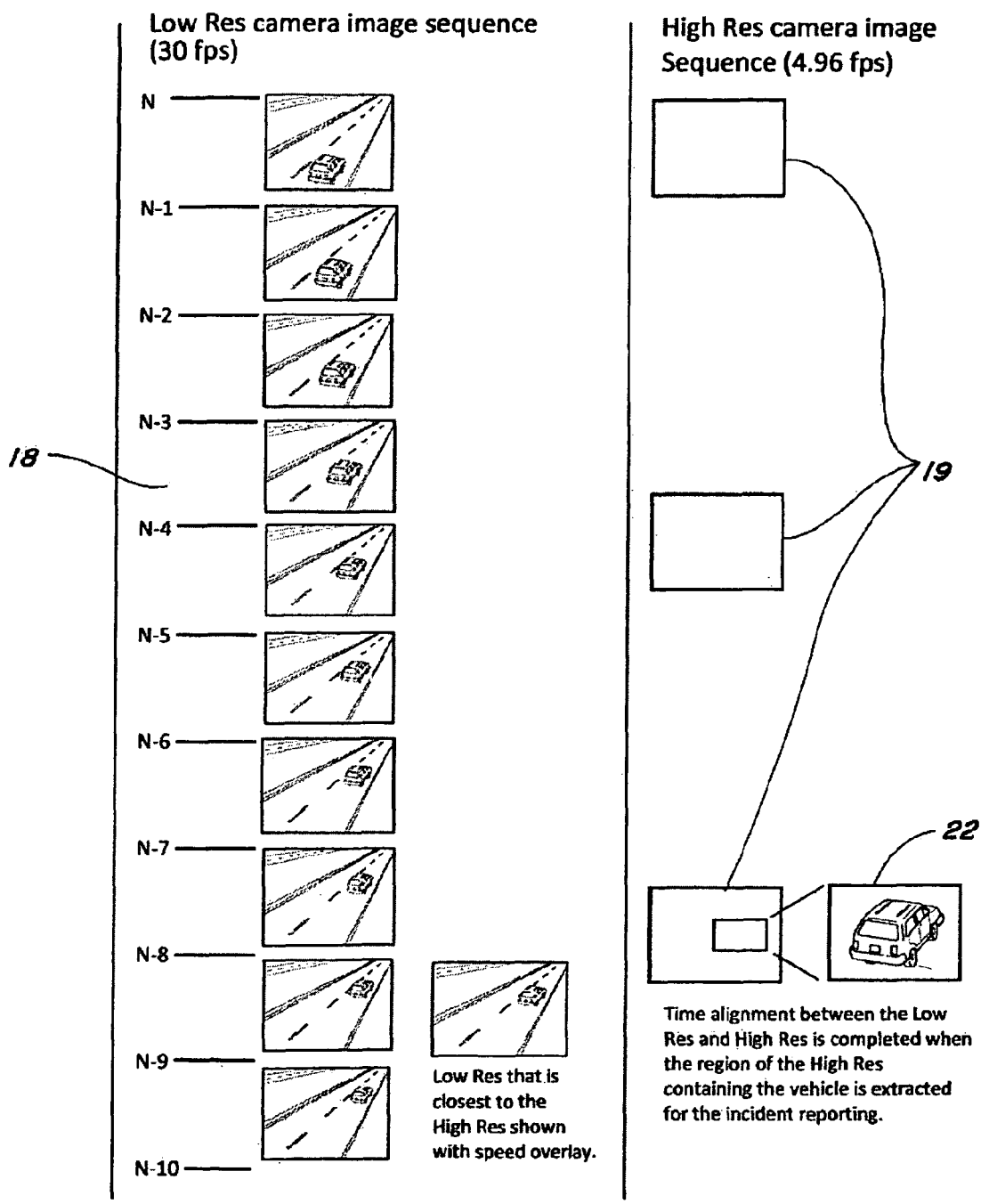
FIG. 9 shows a diagram for analytical coordination of low resolution images with high resolution images for one embodiment of the present invention.
Figure 10:
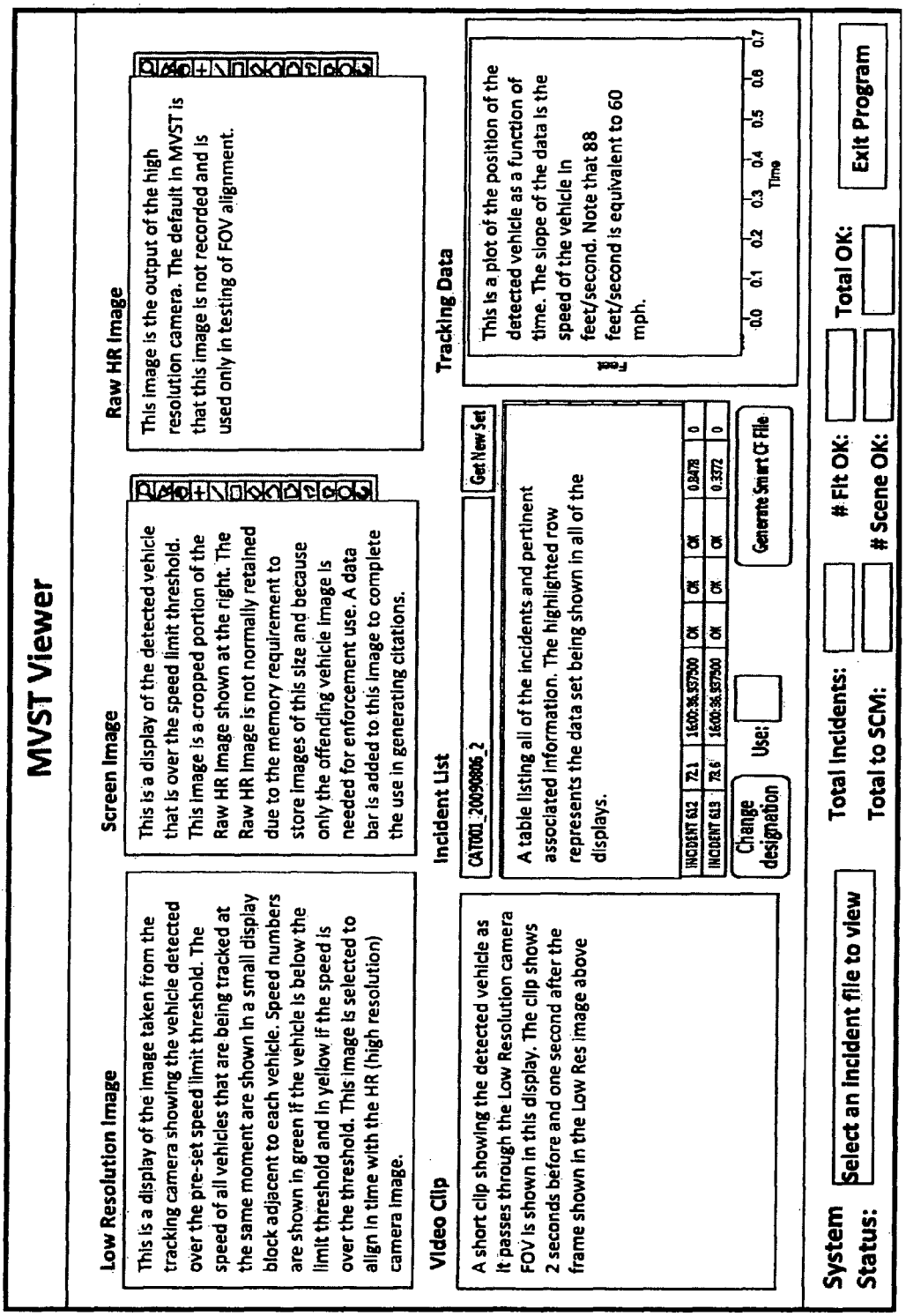
FIG. 10 shows an operator display for the elements shown in a typical set of incident data for one embodiment of the present invention.

FIG. 9 discloses an example of a sequence of images used in the MVST embodiment. FIG. 9 shows frames from the set of low high resolution video images 18 and a set of frames from the set of high resolution video images 19. It is understood that the low resolution image frames 18 and the high resolution image frames 19 are shown in this sequence as being aligned in time across the illustration and progressing down the illustration with the oldest image at the bottom of the illustration and the newest image at the top of the illustration. The variable N represents an arbitrary starting frame of the set of frames from the set of low resolution video images 12A, with each image of the sequence going downward being designated as the initial starting frame N plus an additional ten frames of images. The low resolution column shows each frame as the detected vehicle 12 moves through the filed of view. Tracking of the detected vehicle 12 starts after the detected vehicle is entirely within the field of view and the tracking ends at a pre-selected boundary established during the set up of this embodiment of the MVST. The number of tracking point frames N obtained depends on the speed of the detected vehicle 12, the placement of the low resolution vide camera 3A, and the requirements of the software package 8 used. Nevertheless, in a preferred embodiment, a minimum number of that images closest to the bottom of the field of vision of the frame N are used because the detection points at that portion of the filed of view have the smallest size when converted to real world distances and, as a result, provide the best location resolution for the detected vehicle 12.

As noted above, when the speed of the detected vehicle 12 exceeds the predetermined speed for the roadway being monitored, the detected vehicle becomes a violating detected vehicle and the software package 8 generates the incident data set 16 related to the violating detected vehicle. When the incident data set 16 as shown in FIG. 8 is generated by the software package 8 for a violating detected vehicle 12, the incident data set generally includes a violation portion 21 of the set of low resolution video images 12A obtained by the low resolution video camera 3A at the time the detected vehicle was violating speed limit for the monitored roadway, the vehicle speed box 15 to show the speed of the detected vehicle 12, and a close up of at least one frame from the set of high resolution images 20 obtained at the time the set of low resolution images were obtained by the low resolution video camera 3A.

It is noted that the set of frames from high resolution images 19 shown in FIG. 9 contain fewer images than the set of frames from the set of low resolution images 18 during the same time sequence. Those of skill in the art will understand that the difference in the number of images is the result of the longer length of time required to capture the greater number of pixels needed to obtain a single frame for the set of high resolution video images 12B than the length of time needed to capture the lower number of pixels needed to obtain a single frame for the set of low resolution video images 12A. In other words, it takes less time to obtain the low resolution image frame than it does to obtain the high resolution image frame. Thus, more frames for the set of low resolution images 12A than frames for the set of high resolution images 12B are obtained during the same span of time.

As the set of low resolution video images 12A and the set of high resolution images 12B are stored, each frame of the low resolution images and each frame of the high resolution image obtains its own time tag. This is done by applying each time tag to the frame of the set of low resolution video images 12A and the set of high resolution video images 12B as both of those sets of images are received by the software package 8 of the MVST. Thereafter, the frames from the set of high resolution image 12B that coincide with the time that the frames from the set of low resolution video images 12A were taken is accomplished by matching the low resolution time tags associated with a sequence of low resolution images with the high resolution time tags associated with the high resolution images. After the time tag match is accomplished, the appropriate high resolution image is extracted from the sequence of high resolution images.

After time tag for the frames from the set of the set of high resolution video images 12B are found that match the time tag of the frames from the set of low resolution video images 12A, the set of low resolution video images 12A for the violating detected vehicle 12 is used to identify the location pixel coordinates of the violating detected vehicle 12 within the low resolution video image. Additionally, the frame from the low resolution video image 12A is also used to determine the general size of the violating detected vehicle 12 by identifying the pixel coordinates within the low resolution image that outline the image of the violating detected vehicle. The software package 8 then uses the values of those coordinates and scales those values onto the matching high resolution video images 12B to extract a region from the frame of the high resolution video image that matches the region from frame from the low resolution video image where the violating detected vehicle 12 was positioned. Thus, FIG. 9 shows an example of a region 22 extracted from the set of high resolution video images 12B that best matched the region from the set of low resolution images 12A where the violating detected vehicle 12 was located.

It will be appreciated that during the setting up of various preferred embodiments of the MVST, the operator should position the low resolution video camera 3A and the high resolution video camera 3B such that the image of the roadway being shown in each of those cameras is a similar as possible. This similarity of images results in better processing of the video image information by the software package 8. The alignment of the cameras is accomplished by the operator as the operator views images from each of the cameras that can be simultaneously displayed on a display screen of the computer system 7.

II. Description of the Software Package in a Preferred Embodiment

Figure 11:
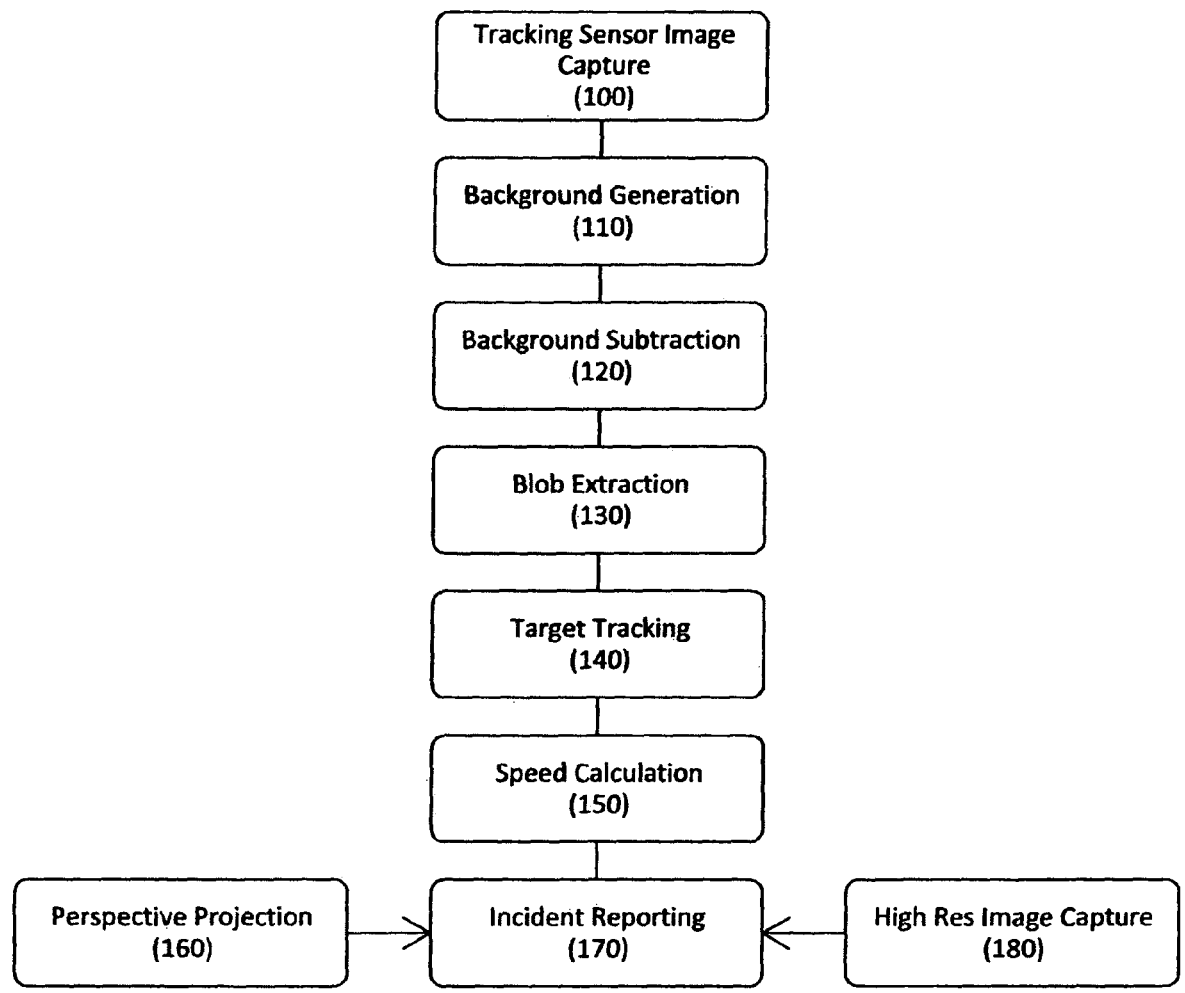
FIG. 11 shows a software flow chart for one embodiment of the present invention.

The program flow and main modular components of the MVST embodiment software package 8 are generally as shown in FIG. 11. Each is the modules 100 through 180 is described in detail below. It is understood that FIG. 11 shows only certain main processing tasks of the program. Other aspects of the program such as manual entry screens are not broken out separately, but instead will be referred to in relation to the main components. Additionally, it is understood that other operations that include the general interfacing of the modules 100-180 are detailed because such other operations are well known in the art.

Calibration

Prior to operating the MVST embodiment of the present invention, the MVST system should be calibrated to the specific setup and placement of the MVST system at a roadway monitoring location. During that calibration, the MVST can displays an image similar to that shown in FIGS. 12a, 12b, and 12c.

Figure 12:
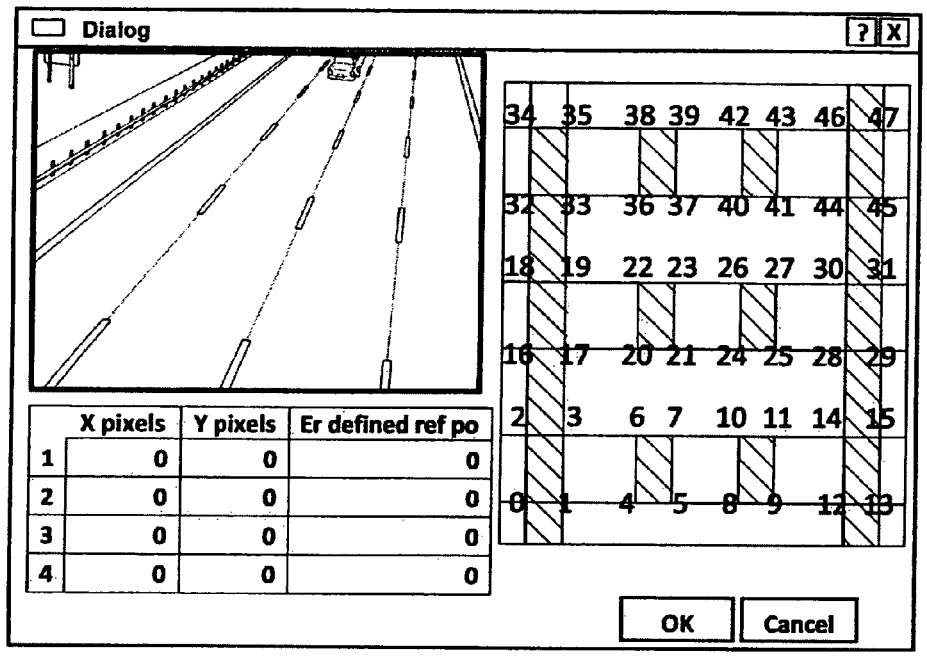
FIG. 12 shows an operator display used for general calibration of one embodiment of the present invention.

FIG. 12 is the calibration window in which an operator identifies known point locations in the field of view that are then used to calibrate the projective projection and scaling to actual distance. The calibration of the MVST embodiment is accomplished by the following steps.

Figure 13:
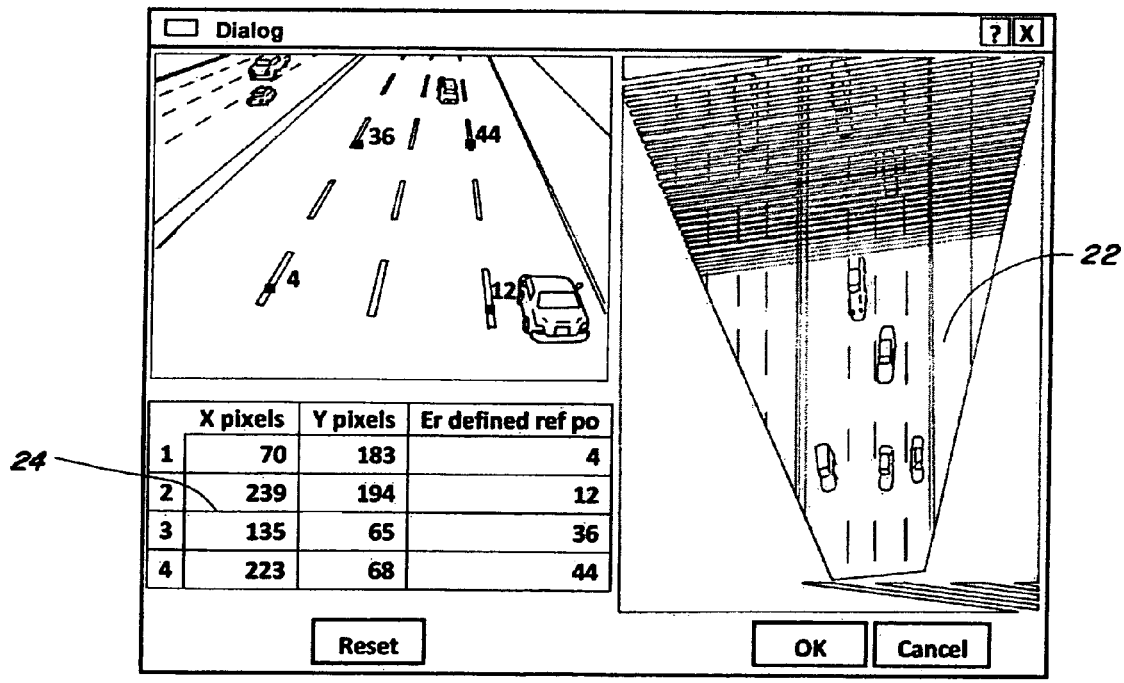
FIG. 13 shows a transformed image of the view from a video camera after transformation of the perspective view into a bird's eye view for one embodiment of the present invention.

Referring to FIG. 13, the images represent the calibration after point selection and running a test by applying the calibration to the currently captured image. The generated image gives a computer generated bird's eye view 22 of an area of roadway 23 captured by the camera by applying projective perspective and dimensional scaling. This bird's eye view 22 is used as a set up test of the selected calibration points to the operator. The third column 24 in the table is associated with the pre-defined stripping designators as shown in FIG. 12. It is understood that the present calibration technique uses the lane striping on the roadway as known points for the purpose of calibration. It is understood that in other embodiments any 4 known points in the field of vision of the video camera can be used for calibration.

In general, the software package used in the current MVST embodiment can include modules 100-180 as shown in FIG. 11 and as further described below.

Module 100—Tracking and Sensor Image Capture

The tracking and sensor image capture module 100 moves the video images received from the low resolution video camera 3A to the computer system 7 via a 1394a PCI Express card interface from a receive buffer to a set of internal buffers and pipeline processing queues. Frame numbering and time tagging of the set of low resolution video images 12A is accomplished by module 100 to provide proper handling of the images and to synchronize the low resolution video camera 3A with the high resolution video camera 3B. No processing of the set of low resolution video images 12A is done within this module to prioritize the receipt and movement of the images onto the processing pipeline. It will be appreciated by those of skill in that art, however, that at least some processing can occur within this module and still remain within the intended scope of the present invention.

In the present MVST embodiment, the low resolution images are generated by the low resolution CCD video camera. In this embodiment, the low resolution CCD video camera has a resolution of about 640×about 480 pixels. It is understood that while other variations of the present invention may utilize that resolution for other applications, for the present MVST embodiment the low resolution CCD video camera is operated in a mode that generates about 320×about 240 pixels in color format at about 30 frames per second (FPS). In this module, each frame is given a low resolution frame number when each frame of the set of low resolution video images 12A is received by the module. In this embodiment, the low resolution frame number is scaled to time using a scaling of 0.0333 seconds per frame. It is understood that the 0.0333 scaling value may be adjusted in other embodiments as necessary to match the frame rate of the video images being analyzed. The process of time tagging each of each frame of the set of low resolution video images 12A is based on the computer clock and may have some variation. While it is recognized that this time tagging process may result in some small variations of time designations, this variation is not critical because this time tagging process is used primarily to report the time of data report generation and to match a frame from the set of high resolution video images 12B with a frame of the set of low resolution video images 12A when such matching is required upon a finding that a detected vehicle has exceeded the predetermined speed.

Module 110—Background Generation

Module 110 is used to separate background data from other data related to the determination of a detected vehicle 12. The separation of the moving vehicles from the remainder of the images from each of the frames of the set of low resolution video images 12A depends on the differences in the images in each frame that is caused by the repositioning of the detected vehicle 12 in each of the frames as the detected vehicle travels against the background of the frame. Because the image in each of the frames of the set of low resolution video images 12A is predominantly constant other than the traveling vehicles, the software package 8 in the current MVST embodiment processes the set of low resolution video images 12A to determine what part of the low resolution video image can be defined as the background image. In most cases the background image is that part of the set of low resolution video images 12A that is generally static between each frame of the set of low resolution video images 12A. After the background image has been determined, the other elements of the frames of the set of low resolution video images 12A can be defined as the foreground elements.

As will be understood by those skilled in the art, the process of separating the background image from the foreground elements is generally accomplished by subtracting the foreground elements from the frames of the set of low resolution video images 12A. The difference after this subtraction process can be defined as the background image.

The software package 8 of the present MVST embodiment incorporates a computer algorithm known generally in the art as an adaptive background subtraction model. One well known adaptive background subtraction model that is used in the present embodiment is identified as the Gaussian Mixture Model and that model is used to extract what can be identified as foreground blobs in the set of low resolution video images 12A from the foreground elements as noted above.

For example, the software package 8 in the present MVST embodiment generates a description of the background from the set of low resolution video images 12A by use of the Mixture of Gaussians (MOG) method. It is noted that the MOG approach is generally defined in a technical paper entitled "Efficient adaptive density estimation per image pixel for the task of background subtraction", Z. Zivkovic, F. van der Heijden, Pattern Recognition Letters, vol. 27, no. 7, pages 773-780, 2006. Five Gaussian distributions are used in the background calculation based on 100 frames of learning. This method can provide slightly better background references with control to adjust the rate of learning and other subtle aspects.

When the background generation process is substantially completed, the background image becomes a representation of the static part of the set of low resolution video images 12A. As noted above, changes between each of the frames of the set of low resolution video images 12A are identified using this background reference. It is understood by those in the art that due to light and slow scene variations, the background image should be adapted either continuously or on a well defined time period as necessary to compensate for such variations, but not so rapidly as to absorb foreground elements that may represent vehicles traveling at speeds of approximately 20 mph. In that way, the MVST embodiment of the present invention can function in areas having complex scenes and pixel images—such areas as, for example, residential neighborhoods and school zones.

Module 120—Background Subtraction & Threshold

In module 120, the background image is subtracted from a frame that is generated by the low resolution video camera 3A viewing a presently occurring scene of the roadway. It is noted that in some embodiments, this includes processing the current image on all color planes. In that variation, this is done pixel-by-pixel by comparing the pixel value on the red, green, and blue color planes to the MOG means. If the compared pixel value is greater than the background value by a specified multiple of the variance, then the compared pixel is defined to be part of the foreground elements. All pixels that are designated to be foreground elements are given the same value and all the background is set to 0. The results from the individual planes are combined into a single binary image that has light areas associated with the parts of the image that are changing on a regular basis and changing location in the image. The end result is the determination of a threshold image used later in the software package 8 of the MVST embodiment.

Module 130—Blob Extraction

In module 130, the blob extraction process is accomplished. Blob extraction is the process of refining the image by filters that clean up blob edges and join areas that are associated with one another. These processes are done to reduce image noise effects and possible variations that may have resulted from the background subtraction module above. In this embodiment, one filter based on a 3 pixel×3 pixel filter is used to shape the edges of the blobs and another 3 pixel×3 pixel filter is used to fill-in or join areas between closely spaced blobs. Module 130 then locates the center, bottom center, and extent of each blob. It is at this point that each blob is given a unique identification number. The extent is determined to be the bounding box that entirely encloses the blob and has sides aligned with the horizontal and vertical sides of the image. A filter condition is applied that requires the blob area to be greater than a pre-planned size. This removes small objects like people, animals, light glint, and shimmer from being considered in further processing. The MVST embodiment is thus generally optimized for detecting objects the size of vehicles.

Module 140—Target Tracking

After the blob is generally processed as described in module 130, blobs that have met the conditions of filters and are within a zone of the image defined at the start of processing are identified by module 140 as targets. Because the location of a moving vehicle at the roadway surface over multiple frames of the set of low resolution video images 12A is what is needed for calculating speed, a target track is determined to be the individual blob information for blobs that have been determined to be a target—and thus a detected vehicle 12.

It is understood that as the target moves into the field of vision, the location of the lower blob edge stays fixed at the boundary of the frame from the set of low resolution video images 12A. An artificial reduced sized image boundary is applied to assure that a detected blob is not moving in and out of the edge of the image. The artificial boundary used on the sides is set at a constant value. The top and bottom artificial boundaries can be adjusted to reflect different camera pose positions. This adjustment can be used to eliminate problems within the field of view that can be caused by obstructions and blobs that are too near the horizon for good position resolution of the target.

In the present MVST embodiment, when a blob is first detected, it is considered a provisional target until it is repeated for at least three successive frames. Even then, the blob under review must have to been uniquely identified as the same target by looking for expected positional changes in the blob between frames and for a minimum overlap area between frames. It is understood that in the first few detections, little is known of the possible direction the blob is moving so a pre-set value is used as an initial predictor of the blob. With the accumulation of additional frames, the motion of the blob can be better projected to get a better next frame prediction of the expected new location of the blob in a subsequent frame. These criteria prevent spoofing from sudden illumination changes in the frame due to blowing trees, shadows from blowing trees, bumps to the camera, and similar effects that give rise to short term, non-vehicle motion.

The first classification of a blob as a target is entered into a track table along with the associated blob parameters, frame number, and time tag. This is continued from the beginning of the blob detection until it leaves the boundaries established for the low resolution video camera 3A field of vision. The target is then passed on to subsequent processing steps when track of the blob exits the detection area of the blob as described in the blob extraction module 130.

Obscured targets can occur due to blocking of the low resolution video camera 3A as a vehicle passes behind another vehicle or a fixed obstruction such as a pole. To reduce the potential for a blob to be dropped because it may be missing from a frame from the set of low resolution video images 12A, the MVST embodiment allows up to three successive frames of obstruction before dropping the track of the potential target blob from the tracking table. It will be appreciated that other conditions of classification can also be used as needed to ensure that the same target is being tracked. The tracking data for the established target blob is shown with this time gap to produce a correct calculation of speed and to maintain time synchronization with the set of high resolution video images 12B.

Although the above describes the method used in the present embodiment for the collection of data to be analyzed, it is understood that other input data other than photographic video images can be used and still remain within the scope of the present invention. For example, thermal imaging devices can be used to collect a data set for moving objects that can be adapted to fit within the MVST software modules. Additionally, sound wave detection may also be used. In fact, any type of detection device that can collect a set of data for a moving object that is moving against a known background can be used and still remain within the scope of the present invention.

Module 150—Speed Calculation

After the confirmation of a target blob from module 140, the calculation of speed of the target blob is based on a minimum number of tracking points and applying a least squares fit to the distance traveled versus the time it takes the blob to travel. This process is accomplished in module 150. Tracking data is usually in terms of pixel location and generally has to be converted to real world dimensions. This is done using a homographic calibration process that is executed at the set up of the MVST embodiment. More specifically, during the homographic calibration, a 3 element×3 element calibration matrix is available from the calibration that is used to convert pixel coordinates to the real world coordinates. It is understood that other pixel calibration schemes that use sizes other than 3 elements×3 elements may also be used and stay within the intended scope of the present invention.

In this homographic calibration process, the roadway direction is defined as the Y axis of the transformed values. Thus, vehicle travel is expressed in terms of feet in the Y axis. The time is converted by taking the incremented frame values and multiplying by factor of 1/30 when the camera rate is 30 frames per second. The multiplying factor of 1/30 can be adjusted as necessary to match the frame rate of the camera as used in other embodiments of the invention. A linear fit of this line removes random noise and is identified as the speed of the detected vehicle 12. The speed is then converted as necessary to identify the speed as units of miles per hour.

To ensure proper speeds are being determined, the residue of the linear fit is also calculated and a maximum allowed criterion is applied to ensure that the tracking points are highly linear before triggering any indication of exceeding the set miles per hour speed limit. It is understood that the operator of the MVST embodiment has the ability to preset this limit at any value that is consistent with the local laws and ordinances set for the roadway being monitored by the MVST embodiment. If the calculated speed of the detected vehicle 12 exceeds the preset miles per hour limit, the speed information is sent to the incident reporting module 170. Additionally, speeds of every detected vehicle 12 can be displayed as an overlay to the video for monitoring and observation. The speeds of the tracked vehicles can also be saved in a file for generating traffic speed studies.

Module 160—Perspective Projection Module

During calibration of the MVST embodiment of the present invention, perspective projection is a calibration step that can be executed to transform the image in a frame from the set of low resolution video images 12A generated by the low resolution video camera 3A into real world coordinates.

To accomplish this transformation, a transformation matrix is used in module 160 that can take into account the perspective of the frame and the scaling of the frame in single step. The implementation of the transformation matrix is represented in FIG. 12. The calibration of the MVST embodiment is generally based on a pinhole camera model for the geometry. That is to say, by identifying 4 pixel points and the real world locations from the lower left of a frame from the set of low resolution video images 12A, sufficient data is usually available to perform a 4 point calibration. In that instance, a fixed template is shown premised on the belief that the roadway being monitored by the MVST embodiment has lane striping that is sized and aligned in accordance with the applicable Federal Department of Transportation standards. However, this striping orientation is not adequate for the accuracy mandated by the MVST system. Instead, an additional implementation of the MVST embodiment can be used to remove the pre-defined template and utilizes an operator input of a uniquely sized rectangle to remove any dependency on the roadway striping. In this case, existing markings on the roadway or even new markings are applied to the roadway and surveyed to give an accurate baseline measurement of the real world coordinates from which the pixel locations can be designated for the calibration of the MVST embodiment.

An example of this type of calibration is disclosed in FIG. 13 where the image on the right of FIG. 13 shows the projection of a frame from the set of low resolution video images 12A after conversion and recreation with the transformation matrix applied. It is understood that this projection as shown in FIG. 13 is essentially a bird's-eye view 22 of the roadway. The striping will be oriented in the vertical direction and the lines will be parallel if the data is input correctly by the operator. Note that because this projection is a two dimensional calibration, the vehicles in the projection are distorted above the roadway surface. It is for this reason that the tracking points at set the base of the blobs.

Module 170—Incident Reporting

The incident reporter module 170 generates an incident file for situations that result in the determination of a speeding incident. In the MVST embodiment, the incident file is generated for every detected vehicle 12 when the speed calculation module 150 has determined that the detected vehicle is traveling at a speed that is greater then the predetermined maximum speed designated for the roadway being monitored by the MVST embodiment of the present invention. The incident file contains basic information regarding the detected vehicle 12 speeding incident and can include data such as the time of the speeding incident, the date of the speeding incident, the location of the speeding incident, the specific hardware components used by the MVST embodiment at the time of the speeding incident, the description of the software package used by the MVST embodiment at the moment of the speeding incident, the real world tracking points used in the speed calculation related to the speeding incident, the perspective calibration values and images used in the calculation of the detected vehicle at the time of the speeding incident.

FIG. 8 shows an example of what a preferred embodiment of the MVST system would contain. In that example, the incident file could contain the violation portion 21 of the set of low resolution video images 12A taken during the period when the speeding vehicle 12 was determined to be speeding. It is noted that in this example, the vehicle speed box 15 is shown adjacent to the speeding detected vehicle 12. The close up 17 of at least one frame from the set of high resolution video images 12B would also be included in the incident file. A close up view 20 of the same frame from the set of high resolution video images 12B can also be displayed wherein the display more readily display the license plate of the speeding detected vehicle 12. To show part of the general relationship between the data related to the speeding detected vehicle 12 and any other vehicles around the speeding detected vehicle, an incident list 25 can be displayed. Finally, for some additional verification of the calculations executed by the MVST software package, a tracking data frame 26 can be included show a graphic depiction of the speed versus the distance of the speeding vehicle at the time of the speeding incident.

Module 180—High Resolution Image Capturing

Module 180 is used in the capture of high resolution video images. A high resolution image in the MVST system is generally a 5 mega pixel color ⅔ format CCD. The pixels are arranged in 2452 vertical by 2056 horizontal and are 3.5 microns square. The preferred high resolution video camera follows the industry Digital Camera Standard (DCAM) and uses an 800 MB/sec Firewire 1394b serial communications connection. Frames are transferred in RGB data format and achieve just fewer than 5 frames per second rate. The actual rate varies slightly due to the packet nature of the data and the communications.

It is understood that the set of high resolution video images from this module are used by other modules as needed by the software package 8 of the present embodiment.

While the above description describes various embodiments of the present invention, it will be clear that the present invention may be otherwise easily adapted to fit any configuration where a multiple object speed tracking system is required. Additionally, as various changes could be made in the above constructions without departing from the scope of the invention, it is also intended that all matter contained in the above description or shown in the accompanying drawings shall be interpreted as illustrative and not in a limiting sense. The scope of the invention should be determined by the appended claims and their legal equivalents, rather than by the examples given.

What is claimed is:

1. A multiple object speed tracking apparatus comprising:
a camera positioned to capture images of a monitored area;
a set of images of the monitored area that are generated by the camera;
a computer system that can analyze the set of images to detect at least two moving objects that are moving simultaneously within the monitored area;
wherein the computer system provides an on-site speed calibration process that includes a single process for transforming a single frame from the set of images into real world coordinates by considering, in a single step, the perspective of the image in a single frame from the set of images and the scaling of the image in the same single frame from the set of images; and,
an apparatus mount upon which at least one of either the camera or the computer system is positioned, wherein the apparatus mount is one of either a fixed mount or a mobile mount, and wherein a longitudinal axis of the camera may be positioned at any viewing angle in relation to a longitudinal axis of a roadway as long the viewing angle allows images of the at least two moving objects to be included in one of either the set of low resolution images or the set of high resolution images.

2. The multiple object speed tracking apparatus of claim 1 wherein the computer system can substantially simultaneously determine a calculated rate of speed of at least two of the moving objects.

3. The multiple object speed tracking apparatus of claim 2 wherein the computer system can compare the calculated rate of speed of the at least two moving objects to a predetermined speed value, wherein the computer system includes a homographic calibration process of determining the calculated rate of speed of the at least two moving objects that includes a linear fit comparison of a set of elements related to a distance traveled by the at least two moving object to a time taken for the at least two moving objects to travel that distance, and wherein the computer system includes a process to ensure better accuracy of the calculated speed of the moving object by not indicating an object has exceeded the predetermined speed value until determining that a value of a residue of the liner fit does not exceed a preset maximum value of the residue of the linear fit.

4. The multiple object speed tracking apparatus of claim 3 wherein a set of incident data is generated when the rate of speed of the at least two moving objects exceeds the predetermined speed value.

5. The multiple object speed tracking apparatus of claim 4 further comprising a camera housing and a camera housing positioning unit disposed on the apparatus mount.

6. The multiple object speed tracking apparatus of claim 4 further comprising a camera housing positioning unit mounted on a mast to position the camera at an elevation of at least about fifteen feet above ground level.

7. The multiple object speed tracking apparatus of claim 5 wherein the camera is a low resolution camera operatively disposed within the camera housing.

8. The multiple object speed tracking apparatus of claim 7 further comprising a high resolution camera operatively disposed within the camera housing.

9. The multiple object speed tracking apparatus of claim 8 wherein the low resolution camera communicates the set of low resolution images to the computer system, and wherein the high resolution camera communicates a set of high resolution images to the computer system.

10. The multiple object speed tracking apparatus of claim 9 wherein the computer system communicates with the camera housing positioning unit to tilt, pan, and achieve an alignment of at least one of either the low resolution camera or the high resolution camera wherein the alignment allows at least one of either the low resolution camera or the high resolution camera to capture at least one of either the set of low resolution images or the set of high resolution images of the monitored area in which a plurality of moving objects are found.

11. The multiple object speed tracking apparatus of claim 10 wherein the at least two moving objects are automotive vehicles and the monitored area includes a portion of a roadway upon which the automotive vehicles are moving.

12. The multiple object speed tracking apparatus of claim 11 wherein the computer system includes a display monitor that can simultaneously display at least one of either the low resolution images or the high resolution images to an operator of the multiple object speed tracking apparatus.

13. The multiple object speed tracking apparatus of claim 12 wherein the display monitor displays a speed indicator window positioned adjacent to each of the at least two moving objects in one of either the set of low resolution images or the set of high resolution images.

14. The multiple object speed tracking apparatus of claim 13 wherein the speed indicator window includes a signal that the rate of speed of the at least two moving objects exceeds the predetermined speed.

15. The multiple object speed tracking apparatus of claim 13 wherein the set of incident data includes at least one of either a portion of an image of the monitored area generated during a time when the rate of speed of the moving object exceeded the value of the predetermined speed, the speed indicator window displaying the speed of the moving object during the time when the rate of speed of the moving object exceeded the value of the predetermined speed, an identification image that includes a set of identification information related to the moving object having a rate of speed that exceeds the predetermined speed, an incident list having information about other moving objects detected at about the same period of time during which the rate of speed of the moving object exceeded the predetermined speed, and a set of information related to the determination by the computer system that the rate of speed of the moving object exceeds the predetermined speed.

16. The multiple object speed tracking apparatus of claim 15 wherein the set of identification information includes at least one of either a license plate mounted on the moving object whose rate of speed has exceeded the value of the predetermined speed or a set of descriptive data related to the appearance of the moving object whose rate of spped has exceeded the value of the predetermined speed.

17. The multiple object speed tracking apparatus of claim 16 further comprising a thermal imaging device capable of providing information to the computer system that allows the computer system to detect a moving object and determine a rate of speed of the moving object.

18. A multiple object speed tracking apparatus comprising:
   a camera housing and a camera housing positioning unit;
   a low resolution camera operatively disposed near the camera housing;
   a high resolution camera operatively disposed near the camera housing;
   a computer system including a display wherein the low resolution camera communicates a set of low resolution images to the computer system, wherein the high resolution camera communicates a set of high resolution images to the computer system, and the computer system communicates with the camera housing positioning unit to tilt, pan, and achieve an alignment of at least one of either the low resolution camera or the high resolution camera wherein the alignment allows at least one of either the low resolution camera or the high resolution camera to capture at least one of either the set of low resolution images or the set of high resolution images of a monitored area in which a plurality of moving objects are moving;
   an apparatus mount upon which at least one of either the low resolution camera, the high resolution camera, or the computer system is positioned, wherein the apparatus mount is one of either a fixed mount or a mobile mount, and wherein a longitudinal axis of the camera may be positioned at any viewing angle in relation to a longitudinal axis of a roadway as long the viewing angle allows images of the at least two moving objects to be included in one of either the set of low resolution images or the set of high resolution images; and,
   a software for;
      analyzing at least one of either the set of low resolution images or the set of high resolution images;
      utilizing a speed calibration process that includes transforming a single frame from the set of low resolution images into real world coordinates by considering, in a single step, the perspective of the image in a single frame from the set of low resolution images and the scaling of the image in the same single frame from the set of low resolution images;
      detecting at least one of the plurality of moving objects;
      determining a speed of travel for the at least one of the plurality of moving objects;
      determining if the speed of travel exceeds a predetermined speed value wherein the computer system includes a homographic calibration process of determining the calculated rate of speed of the at least two moving objects that includes a linear fit comparison of a set of elements related to a distance traveled by the at least two moving object to a time taken for the at least two moving objects to travel that distance, and wherein the computer system includes a process to ensure better accuracy of the calculated speed of the moving object by not indicating an object has exceeded the predetermined speed value until a determining that a value of a residue of the liner fit does not exceed a preset maximum value of the residue of the linear fit; and,
      determining an identification of the at least one of the plurality of objects that has exceeded the predetermined speed value; and
      preparing a set of incident data related to the at least one of the plurality of objects that has exceeded the predetermined speed value wherein the set of incident data is usable by authorized law enforcement agencies to enforce vehicle speed limits on a roadway by notifying and penalizing the owner of the vehicle that was moving faster than the value of the predetermined speed.

19. The multiple object speed tracking apparatus of claim 18 wherein the display monitor displays a speed indicator window positioned adjacent to at least one of the moving objects in one of either the set of low resolution images or the set of high resolution images.

20. The multiple object speed tracking apparatus of claim 19 wherein the set of incident data includes at least one of either a portion of an image of the monitored area generated during a time when the rate of speed of the moving object exceeded the value of the predetermined speed, the speed indicator window displaying the speed of the moving object during the time when the rate of speed of the moving object exceeded the value of the predetermined speed, an identification image that includes a set of identification information related to the moving object having a rate of speed that exceeds the predetermined speed, an incident list having information about other moving objects detected at about the same period of time during which the rate of speed of the moving object exceeded the predetermined speed, and a set of information related to the determination by the computer system that the rate of speed of the moving object exceeds the predetermined speed.

21. A multiple object speed tracking apparatus comprising:
   a camera housing and a camera housing positioning unit;
   a low resolution camera operatively disposed near the camera housing wherein the low resolution camera captures a set of low resolution images;
   a high resolution camera operatively disposed near the camera housing wherein the high resolution camera captures a set of high resolution images;
   an apparatus mount upon which at least one of either the low resolution camera, the high resolution camera, or the computer system is positioned, wherein the apparatus mount is one of either a fixed mount or a mobile mount, and wherein a longitudinal axis of the camera may be positioned at any viewing angle in relation to a longitudinal axis of a roadway as long the viewing angle allows images of the at least two moving objects to be included in one of either the set of low resolution images or the set of high resolution images; and,
   a computer system comprising:
      a computer having a user input device and a storage media system;
      a monitor capable of showing a status display that includes the set of low resolution images from the low resolution camera and the set of high resolution images from the high resolution camera, wherein the computer system communicates with the camera housing positioning unit to tilt, pan, and achieve an alignment of at least one of either the low resolution camera or the high resolution camera, wherein the alignment allows at least one of either the low resolution camera or the high resolution camera to capture at least one of either the set of low resolution images or the set of high resolution images to capture a set of images of a monitored area in which a plurality of moving objects are found, and wherein the display includes a speed indicator window positioned adjacent to at least two of the moving objects in one of either the low resolution image or the high resolution image; and a computer software package for;

detecting at least two of the plurality of moving objects and a speed of travel for each of the individual plurality of moving objects wherein the software package includes a single process for transforming a single frame from a set of low resolution images into real world coordinates by considering, in a single step, the perspective of the image in a single frame from the set of low resolution images and the scaling of the image in the same single frame from the set of low resolution images;

determining a speed of travel for at least two of the plurality of moving objects;

determining if the speed of travel exceeds a predetermined speed value wherein the computer system includes a homographic calibration process of determining the calculated rate of speed of the at least two moving objects that includes a linear fit comparison of a set of elements related to a distance traveled by the at least two moving object to a time taken for the at least two moving objects to travel that distance, and wherein the computer system includes a process to ensure better accuracy of the calculated speed of the moving object by not indicating an object has exceeded the predetermined speed value until a determining that a value of a residue of the liner fit does not exceed a preset maximum value of the residue of the linear fit;

determining an identification of at least two of the plurality of objects that has exceeded the value of the predetermined speed of travel; and preparing a set of incident data related to at least two of the plurality of objects that has exceeded the value of the predetermined speed of travel wherein the set of incident data includes at least one of either a portion of an image of the monitored area generated during a time when the rate of speed of the moving object exceeded the value of the predetermined speed, the speed indicator window displaying the speed of the moving object during the time when the rate of speed of the moving object exceeded the value of the predetermined speed, an identification image that includes a set of identification information related to the moving object moving at the rate of speed that exceeds the predetermined speed, an incident list having information about other moving objects detected at about the same period of time during which the rate of speed of the moving object exceeded the predetermined speed, and a set of information related to the determination by the computer system that the rate of speed of the moving object exceeds the predetermined speed.

22. The multiple object speed tracking apparatus of claim 21 wherein the plurality of objects are vehicles moving on a plurality of lanes on the roadway, wherein one of either the set of low resolution images and the set of high resolution images contains images of the plurality of vehicles, wherein the set of high resolution images are used by the computer system to determine at least one of either a license plate mounted on the vehicle or a set of descriptive data related to the appearance of the vehicle wherein the display on the monitor includes images of the vehicles moving on the at least to lanes of the roadway and a speed indicator window near each individual vehicle to indicate the speed of the vehicle wherein the speed indicator box displays a first color to indicate the vehicle is not exceeding the value of the predetermined speed, and wherein the indicator window displays a second color to indicate the vehicle is traveling faster than the value of the predetermined speed, wherein the low resolution camera is a low resolution video camera, wherein the set of low resolution images is a set of low resolution video images, wherein the high resolution camera is a high resolution video camera, and wherein the set of high resolution images is a set of high resolution video images, and wherein the computer system stores all images and incident data for a set period of time to allow the images and incident data to be checked for verification and acceptable accuracy at a later time.

23. The multiple object speed tracking apparatus of claim 22 wherein the set of incident data is usable by authorized law enforcement agencies to enforce vehicle speed limits on the roadway by notifying and penalizing the owner of the vehicle that was moving faster than the value of the predetermined speed.

24. The multiple object speed tracking apparatus of claim 17 wherein the low resolution camera is a low resolution video camera, wherein the set of low resolution images is a set of low resolution video images, wherein the high resolution camera is a high resolution video camera, and wherein the set of high resolution images is a set of high resolution video images.

* * * * *